Figure 3:
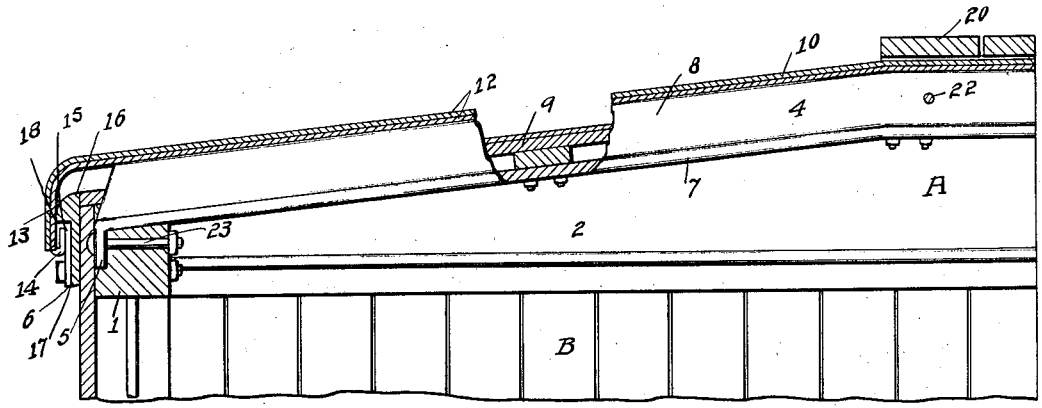

F. HORN.
CAR ROOF.
APPLICATION FILED JUNE 22, 1910.
982,063.
Patented Jan. 17, 1911.
2 SHEETS—SHEET 1.
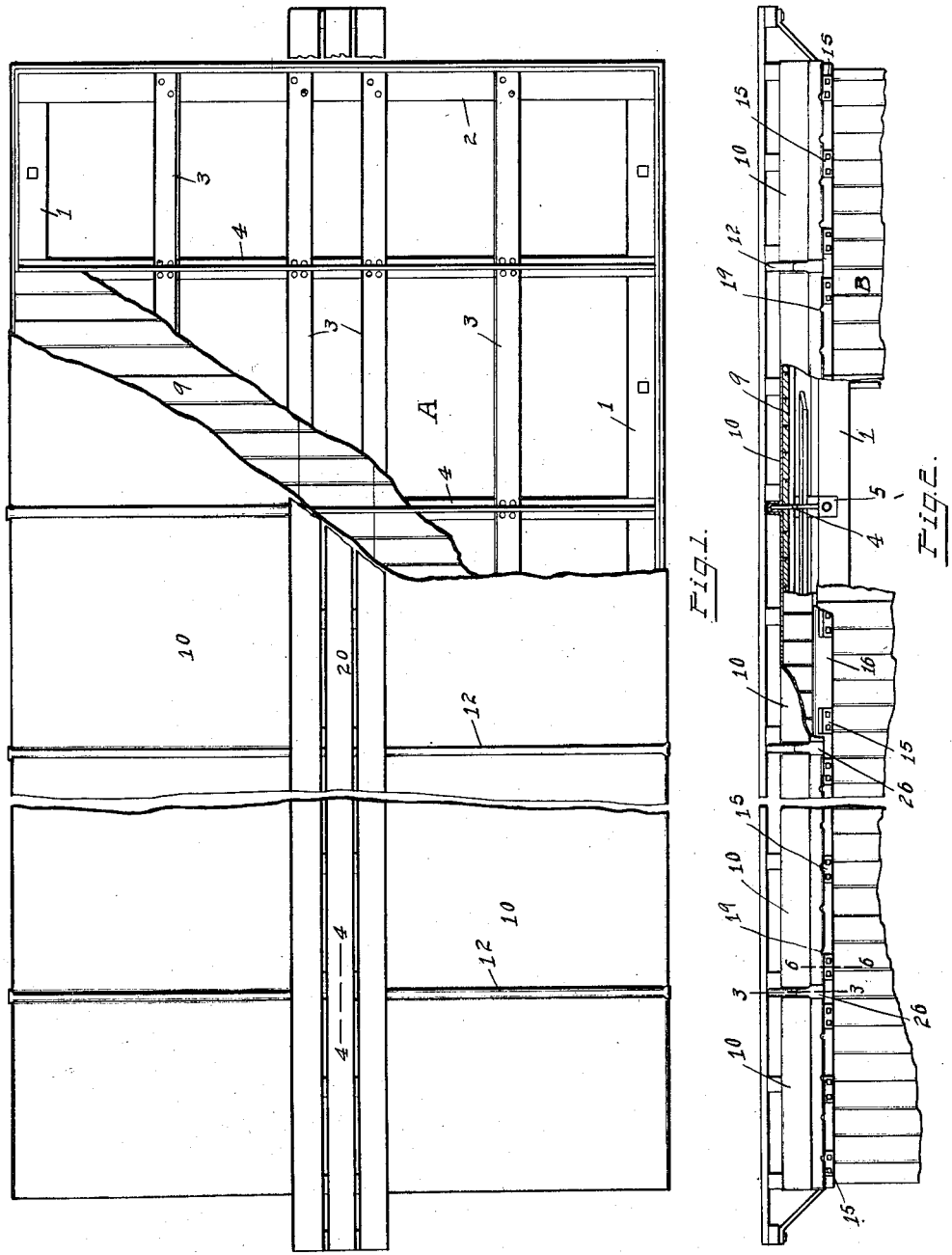
Witnesses
E. B. Maurer
A. L. Phelps
Inventor
Frank Horn
By C. C. Shepherd
Attorney

F. HORN.
CAR ROOF.
APPLICATION FILED JUNE 22, 1910.

982,063.

Patented Jan. 17, 1911.
2 SHEETS—SHEET 2.

Witnesses
E. B. Maurer
A. L. Phelps

Inventor
Frank Horn
By C. C. Shepherd
Attorney

UNITED STATES PATENT OFFICE.

FRANK HORN, OF COLUMBUS, OHIO.

CAR-ROOF.

982,063.

Specification of Letters Patent.

Patented Jan. 17, 1911.

Application filed June 22, 1910. Serial No. 568,253.

*To all whom it may concern:*

Be it known that I, FRANK HORN, a citizen of the United States, residing at Columbus, in the county of Franklin and State of Ohio, have invented certain new and useful Improvements in Car-Roofs, of which the following is a specification.

The present invention relates to car roofs and has particular application to an improved roof, designed for use on freight cars.

In the construction of metal covered car roofs, it is the general practice to rigidly secure the edges of the plates forming the covering, to the side or fascia strips of the car and to terminate the opposite edge of the plate at the center of the car, the ordinary car being formed with a ridge bar. To such a construction certain disadvantages are incident, as the roof is so stiff and rigid that after a brief period the shocks and jars to which the car is subjected, have the effect of destroying such roof. As is well known, the roof of a freight car is subjected to considerable rough usage, wear and tear and stress due to torsional strain and weaving.

It is my purpose in the present instance, to provide a construction of roof capable of attaining a certain degree of flexibility, which will enable the roof to yield to the torsional and weaving strains to which the car is subjected, thereby greatly prolonging the life of the roof.

A further object of my invention is to provide a roof wherein the ridge pole or bar is dispensed with, the carline being so constructed and arranged in conjunction with the purlins, that the employment of such ridge bar is rendered unnecessary.

A further object of my invention is to so construct the carlines and so mount the metallic roof sheets relative thereto, that such sheets, at their point of juncture are supported upon and connected to the vertical web of the carline.

Still another object of my invention is to provide metallic roof sheeting extending transversely of the car roof, continuously, from eave to eave or side to side.

With the above recited objects and others of a similar nature in view, my invention consists in the construction, combination and arrangement of parts set forth in and falling within the scope of the appended claims.

While I have herein shown and described my preferred form of car roof, I wish it to be understood that I do not limit myself to all the precise details of construction, which, by way of illustration are herein delineated, as modification and variation may be made without departing from the spirit of the invention, or exceeding the scope of the claims.

Figure 4:
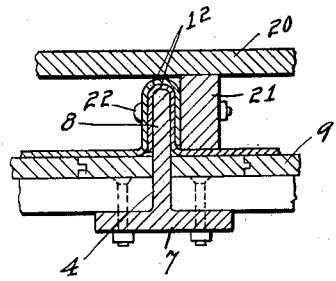
Figure 5:
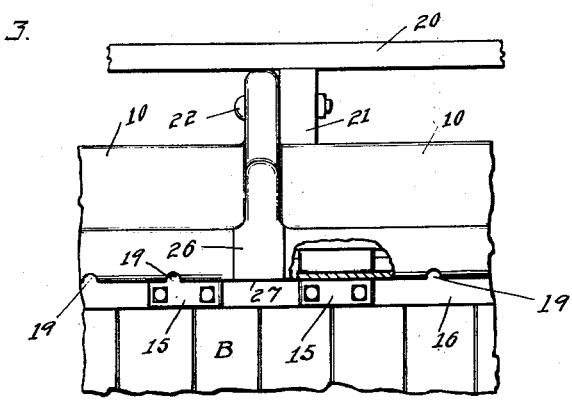
Figure 6:
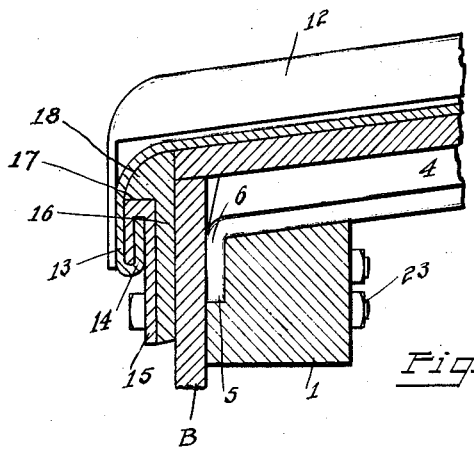
Figure 7:
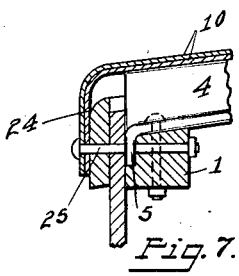

Figure 1 is a top plan view of a car roof embodying my invention, a portion of the roof being broken away to show the interior construction of the same and the arrangement of carlines and purlins, Fig. 2 is a longitudinal view of the roof partly in elevation and partly in section, Fig. 3 is a transverse sectional view taken on the line 3—3 of Fig. 2, Fig. 4 is a detail view in section on the line 4—4 of Fig. 1, Fig. 5 is a detail in elevation showing the manner of connecting the running board to the carline and joint of the roof sheeting, Fig. 6 is a cross sectional view taken at the eave of the car, and, Fig. 7 is a cross sectional view of a modified form of connection of the roof plates and the fascia strip.

Referring now to the accompanying drawings in detail, the letter A designates the roof frame as an entirety, said frame comprising the side plates 1—1, and the edge plates 2—2 riveted thereto. Extending longitudinally of the frame are the purlins 3 suitably spaced apart, the two adjacent to the center being preferably placed relatively closer together than the remainder.

The numeral 4 designates the carlines of the frame, which rest upon the side plates 1 as is shown in detail in Figs. 3 and 6. By reference to Fig. 3, it will be noted that the side plate is recessed longitudinally as at 5 to accommodate the downwardly turned end 6 of the carline. The construction of the carline is shown in section at Fig. 4, such carline comprising the web 7 to which is bolted the end of the purlin, and the vertically extending web 8 so that such carline is approximately T-shaped in cross section. The sheathing of the car is shown at 9, said sheathing comprising a series of boards extending transversely of the roof, and secured to the purlins. I wish it to be understood, however, that in my construction of car, I may dispense entirely with the sheathing 9, the roof being in such case formed of the plates themselves.

The roof plates are indicated by the numeral 10, these plates being formed preferably of sheet metal and extend continuously transversely of the car from eave to eave. The side edges of each plate are bent upward in an inverted U-shaped flange 12, so that when the plates are assembled, one of said flanges overlaps the other, the web 8 of the carline projecting into the flange, as is clearly shown in section in Fig. 4. In assembling the plates in the construction of the roof, I preferably lap the flanges so that where one flange of a sheet is the overlap at one edge, at the opposite side of the sheet, the flange is the underlap. By such a construction, I am enabled to more readily remove the roof plates, should it be necessary. The ends of each plate are turned downward as shown at 13, at the point where the ends turn over the sides or eaves of the car and are then bent upwardly as shown at 14, thus forming a flange. In order to yieldingly secure the plate, I provide the clips 15, which are secured at suitable intervals along the fascia strip 16. By referring to Fig. 6, the manner of locating the securing clips is more clearly shown, the fascia strip being recessed as at 17, so that the outer face of the clip is substantially flush with the shoulder 18 of the fascia strip. In Fig. 2, the clips are shown as spaced apart along the fascia strip, this view illustrating approximately the location of the clips when in use. The doubled edge or flange 13 is provided at suitable points with the holes or perforations 19, the purpose of this being to permit the escape of any matter which may collect therein, such as cinders and the like, and also to permit the outlet of water or moisture, thereby lengthening the life of the strip by avoiding premature rusting.

By reference to Fig. 1, it will be seen that the carlines extend transversely of the frame from eave to eave, and that at the center the carline instead of running into substantially an acute angle and therefore requiring the use of a ridge pole, is formed with obtuse angles, the portion of the carline between these obtuse angular points, being substantially straight. By such a construction, I obviate the necessity of cutting the carlines at the central point, as is usually the practice, and am therefore enabled to place the running board cleats against the straight central portion of the carline and fasten the same with bolts passing transversely therethrough. In the ordinary practice with which I am acquainted, it has heretofore been the custom to fasten the running board with bolts extending vertically through the cleats and carlines. The disadvantageous feature of this has been that openings were formed for the admission of moisture, which disadvantage is entirely obviated by the construction which I have devised.

The running-board of the car is shown at 20, and the manner of securing the running-board forms a novel feature of my invention. By referring to Figs. 4 and 5, it will be seen that a block or saddle 21 is secured at the vertical web 8 of each purlin through the medium of bolts 22, which bolts pass through the overlapping flanges of the roof plates, and through the saddle, the running-board extending over the saddle and being secured thereto in any preferred manner. By such a construction, the board is secured rigidly and firmly in position and at the same time the roof is considerably strengthened. I might here mention that the ends of the carlines are secured to the side plates of the car in any preferred manner, such as by bolts 23, which pass through the downturned flange at the end of the carline and through the side plate. The siding of the car is indicated by the letter B, such siding being built up in the usual manner.

In Fig. 7, I have shown a slightly modified construction, in this instance instead of doubling or turning up the ends of the plates, and hooking the same through the means of the clips, the ends of the sheets are turned downward at the point where they lap the eave, as is shown at 24, the plate being secured through the medium of the bolts 25 which pass through the plate, fascia strip, siding and side plate.

From the above description taken in connection with the drawings, the construction and operation of my improved roof, will be readily apparent to those skilled in the art, and its many advantages manifest. The feature of extending the metal plates continuously from eave to eave, and overlapping the adjoining edges as shown, enables me to provide a roof which is practically continuous and yet permits of certain amount of flexibility, thereby greatly lessening the liability of the plates to tear loose when the car is subjected to torsional strain in taking sidings and switches and curves. Furthermore when the car is subjected to different temperatures and to exposure to the weather, the contraction and expansion of the roof subjects the same to such strain, that the life of the roof is considerably shortened when it is constructed too rigidly. By yieldingly engaging the ends of the sheets or plates at the eaves of the roof and extending the plates continuously across the roof of the car and above the vertical web of the carline in the manner shown, I provide a construction which is subjected to none of the disadvantages of the too rigid roof and at the same time, a construction of roof which may be easily and quickly repaired.

In Fig. 5 of the drawings, it will be seen that at the point where the flanged ends of the adjacent sheets abut, as at 26, the flanges are not turned upward as in Fig. 6, so that provision is thereby made for a space as at 27, whereby the clip may be slipped through such space and moved along to its proper position.

What I claim, is—

1. In a car roof, the combination of the roof frame comprising the side and end plates, carlines therefor having a horizontal web portion and a vertical web portion, purlins extending lengthwise of the car, and resting upon the horizontal web portions of the carlines, a sheathing extending across the frame, and lying below the tops of the vertical web portions of the carlines, a covering for the roof comprising a series of metallic plates having the side edges thereof folded to form inverted U-shaped flanges which overlap and overlie the vertical webs of the carlines, and means for yieldingly connecting the plates at the eaves of the roof.

2. The combination with a car frame, of a plurality of inverted T-shaped carlines extending entirely across the car from one side to the other thereof, a series of metallic roof plates, the edges of which overlap each other and engage with the web portions of said carlines, said plates and their overlapping portions being continuous and unbroken from one side of the car to the other, and means for loosely connecting the ends of said plates to the car frame, said plates being capable of a limited vertical movement with relation to the carlines substantially from the center line of the car to the eaves thereof.

3. The combination with a car frame, of a plurality of inverted T-shaped carlines extending entirely across the car from one side to the other thereof, a series of metallic roof plates, the edges of which overlap each other and loosely engage with the web portions of said carlines, substantially from the center of the car to the eaves thereof, said plates and their overlapping portions being continuous and unbroken from one side of the car to the other, and means for loosely connecting the ends of said plates to the car frame, said car frame comprising side plates, and the extremities of the flange portions of said inverted T-shaped carlines being downturned and engaging in recessed portions of said side plates.

4. The combination with a car frame, of a plurality of inverted T-shaped carlines extending entirely across the car from one side to the other thereof, a series of metallic roof plates, the edges of which overlap each other and loosely engage with the web portions of said carlines substantially from the center of the car to the eaves thereof, said plates and their overlapping portions being continuous and unbroken from one side of the car to the other, and means for loosely connecting the ends of said plates to the car frame, there being one of said plates between each pair of carlines.

5. The combination with a car frame, of a plurality of inverted T-shaped carlines extending entirely across the car from one side to the other thereof, a series of metallic roof plates, the edges of which overlap each other and loosely engage with the web portions of said carlines substantially from the center of the car to the eaves thereof, said plates and their overlapping portions being continuous and unbroken from one side of the car to the other, means for loosely connecting the ends of said plates to the car frame, said means comprising upturned extensions upon said roof plates which do not extend the full width of said roof plates, and fastening devices adapted to be secured to the car frame with which said upturned extensions have loose engagement.

6. The combination with a car frame, of a plurality of inverted T-shaped carlines extending entirely across the car from one side to the other thereof, a series of metallic roof plates, the edges of which overlap each other and engage with the web portions of said carlines, said plates and their overlapping portions being continuous and unbroken from one side of the car to the other, means for loosely connecting the ends of said plates to the car frame, said means comprising upturned extensions upon said car roof plates which do not extend the full width of said roof plates, and fastening devices adapted to be secured to the car frame with which said upturned extensions have loose engagement, the space formed between the ends of said upturned extensions by terminating them short of the abutting edges of the roof plates, being sufficient to permit the insertion or withdrawal of said fastening devices.

7. In a car construction, the combination with a car frame, of a plurality of metallic roof plates, the adjacent side edges of which interengage with each other, and means for loosely connecting the ends of said roof plates to the car frame, said means comprising upturned extensions upon the ends of said plates which do not extend the full width of said plates, to leave a space therebetween, and brackets of such size as to pass through said space, said brackets being secured to the car frame and loosely engaging said extensions.

8. The combination with a car frame, of a plurality of inverted T-shaped carlines extending entirely across the car from one side to the other thereof, a series of metallic roof plates, the edges of which overlap each other and loosely engage with the web portions of said carlines substantially from the center of the car to the eaves thereof, said plates and their overlapping portions being continuous and unbroken from one side of the car to the other, means for loosely connecting the ends of said plates to the car frame, said means comprising upturned extensions upon said roof plates which do not extend the full width of said roof plates, and fastening devices adapted to be secured to the car frame with which said upturned extensions have loose engagement, the metal of said plates being perforated at their juncture with said upturned extensions to permit the escape of foreign matter.

9. The combination with a car frame, of a plurality of inverted T-shaped carlines extending entirely across the car from one side to the other thereof, a series of metallic roof plates, the edges of which overlap each other and engage with the web portions of said carlines, said plates and their overlapping portions being continuous and unbroken from one side of the car to the other, means for loosely connecting the ends of said plates to the car frame, said plates being capable of a limited vertical movement with relation to the carlines substantially from the center line of the car to the eaves thereof, running board saddle blocks, fastening devices passing through the overlapping portions of said plates and through the web portions of the carlines, and a running board on said saddle blocks.

10. In a car roof, the combination with a car frame, of inverted T-shaped carlines therefor, and a covering comprising metallic plates having continuous unbroken overlapping edges which overlie the vertically extending portions of the carlines and are capable of a limited vertical movement with relation to said carlines substantially from the center of the car to the eaves thereof, said plates being yieldingly connected to the eaves of the roof.

In testimony whereof I affix my signature in presence of two witnesses.

FRANK HORN.

Witnesses:
 A. L. PHELPS,
 INGLE A. MORRIS.